Nov. 12, 1968 M. BRAMSON 3,410,650
APPARATUS FOR STERILIZING ARTICLES AND PRODUCING DISTILLED WATER
Filed Aug. 25, 1966

INVENTOR
Maurice Bramson
BY Olive H. Bramson
ATTORNEY

United States Patent Office 3,410,650
Patented Nov. 12, 1968

3,410,650
APPARATUS FOR STERILIZING ARTICLES AND PRODUCING DISTILLED WATER
Maurice Bramson, 16 Woodcrest Road,
Kings Point, N.Y. 11024
Filed Aug. 25, 1966, Ser. No. 575,135
3 Claims. (Cl. 21—98)

ABSTRACT OF THE DISCLOSURE

A device is provided for simultaneously sterilizing surgical articles and the like and manufacturing sterilized distilled water. An autoclave is provided having a heating element therein into which autoclave the items to be sterilized are to be placed. At the upper portion of the autoclave is an exit hole to which is attached a coiled capillary tube. The capacity of the heater as compared to the diameter of the capillary tube is such that steam pressure is maintained, the constantly generated steam leaving through the capillary tube and being condensed therein, the so-condensed water being collected at the bottom of the capillary tube.

---

This invention relates to the preparation of distilled and/or sterilized water and to the provision of apparatus therefor.

More particularly, the present invention contemplates the utilization of a conventional autoclaving or sterilizing apparatus, modified as described herein, to permit the collection of sterilized and distilled water during the accomplishment of the normal operation of the apparatus for sterilizing surgical articles, liquids and the like.

Although the preparation of distilled and sterilized water has, heretofore, been accomplished by withdrawing and condensing steam from a pressure vessel, said withdrawal of the steam is accompanied by a substantial or total pressure drop within the vessel, and accordingly, a new pressure build-up is required subsequent to each withdrawal and condensation cycle. See, e.g., U.S. Patent No. 1,183,142 in which such procedure is disclosed.

Consequently, the utilization of an autoclave pressure chamber for the manufacture of distilled and sterilized water, cannot, in view of prior art teachings and existing apparatus, be effectuated while the autoclave is being used for sterilization purposes, inasmuch as any substantial drop in the chamber pressure during the sterilizing cycle, would destroy any assurance of complete sterilization.

Accordingly, through the application of the instant disclosure, it has been found that a pressurized steam atmosphere of, e.g., 250° F., generated within or directly supplied to an autoclave chamber, can be continually withdrawn therefrom, and condensed and collected to form sterilized and distilled water without any appreciable drop in the chamber pressure and without, therefore, interruption of the sterilization of objects loaded within said chamber.

Therefore, an object of the invention is to provide an apparatus which may be concurrently used to sterilize articles and to produce distilled water.

Another object of the present invention is to provide a distillation apparatus wherein air may be utilized as the coolant ambient with respect to the condensation member.

A further object of the instant invention resides in the provision of a method of utilizing a convention autoclave as a source of distilled water.

It will be understood that the foregoing general objectives and the following detailed description as well are exemplary and explanatory but are not restrictive of the invention.

The accompanying drawings referred to herein and constituting a part hereof, illustrate one embodiment of the invention, and together with the description, serve to explain the principles of the invention.

Figure 1:
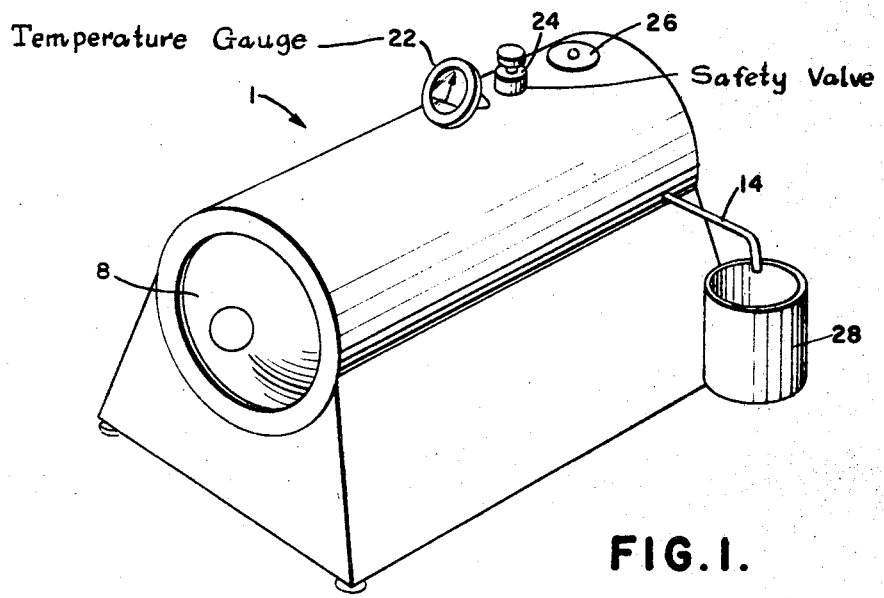
FIG. 1 is a perspective view of a conventional type sterilizer, modified, however, to include a condensation chamber and conduit means passing into said chamber.
Figure 2:
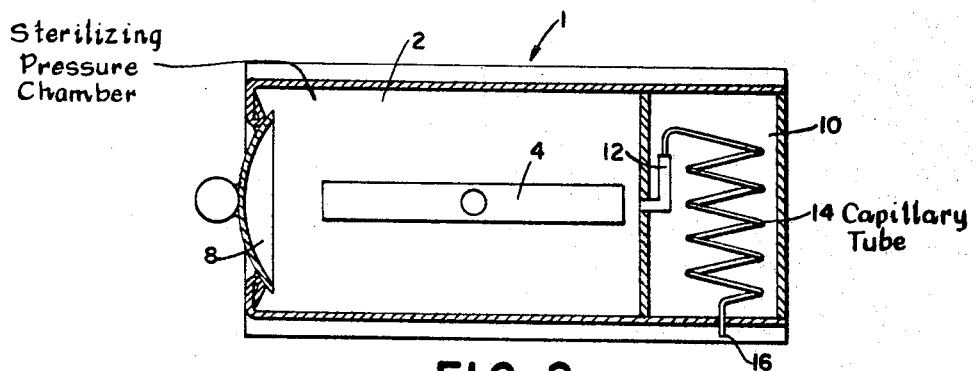
FIG. 2 is a horizontal sectional view of the apparatus shown in FIG. 1.
Figure 3:
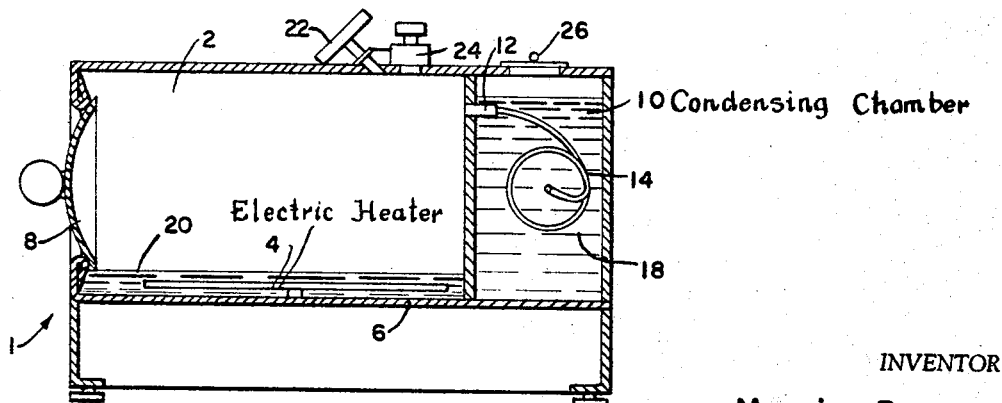
FIG. 3 is a cross-sectional side elevational view of the apparatus.

Referring now in detail to the accompanying drawings, FIGURES 1-3 show an autoclaving apparatus designated generally by numeral 1 in the various positions as heretofore described.

More specifically, the apparatus will be seen to comprise sterilizing or pressure chamber 2, having an electrically energizable heating element 4 disposed adjacent the lower wall 6 of said chamber, a door 8 at the forward end thereof, a condensation chamber 10 at the other end thereof and a conduit 12 communicating between said pressure and condensation chambers 2 and 10, respectively. It will be seen that said conduit includes elongated restriction tubing 14 through which the steam from chamber 2 is educted and wherein said steam condenses into the liquid phase, water. By dint of the fineness of said restriction tubing, egress therethrough does not substantially affect the pressure value within the sterilization chamber, but nevertheless permits such egress and consequent condensation thereof to provide distilled and sterilized water during the normal operation of the sterilizer.

Where the restriction tubing is exceptionally fine, as e.g., .018″ capillary tubing, it has been found that ambient air alone about the tubing will occasion sufficient heat transfer to form the condensate. To expedite such formation and to effectively eliminate any loss of steam through end 16 of the tubing, the latter is preferably immersed in a liquid coolant 18 such as water.

Although not shown, a valve or stop cock may be provided at end 16 or somewhere suitable along the conduit, whereby the condensate production can be curtailed if desired.

It will be understood that element 4, the steam generating means shown herein, is capable of converting water 20 into steam at a rate at least as great as the rate at which said conduit permits the discharge of steam therethrough, whereby steam pressure within said chamber 2 can be substantially maintained at a selected value during the egress of steam through said conduit. Controls for such selection are, although not shown, normally provided on an autoclave, temperature gauge 22 and safety valve 24 shown being part of such a control system.

Removable closure 26 permits access to an opening wherethrough condensation chamber 10 may be filled with water. In FIGURE 1 is shown a beaker 28 which may be used for collecting the condensate.

Apart from the apparatus as shown herein, of equal import concerning the present invention is the method or procedure of preparing the distilled and/or sterilized water, said method comprising essentially, establishing a source of pressurized steam, withdrawing steam from said steam source, maintaining the pressure of said steam source during the withdrawal of steam therefrom, condensing the steam as the latter is withdrawn from said source, and collecting the condensate.

It will be appreciated that where sterilized as well as distilled water is desired, the steam being condensed must be maintained preferably at a temperature of at least 250° F. and as is well known, a pressure of at least 15 p.s.i. will be required to maintain such temperatures. Such criteria will also apply with respect to the autoclaving operation using the apparatus described herein.

Insofar as concerns the method disclosed hereinabove, it will be appreciated that said method can be performed by machines other than the autoclaving apparatus shown and described herein. For example, a pressurized steam source such as produced by a gas fired boiler may be withdrawn through a conduit at a rate less than the steam generating rate, and suitably condensed and collected. Further, the pressurized steam source can be established in a pressure vessel supplied by said boiler at a temperature of at least 250° F. and the sterilization of articles can be accomplished within said pressure vessel.

What is claimed is:

1. Apparatus for sterilizing articles and for preparing distilled water comprising a pressure chamber, steam generating means for supplying steam within said pressure chamber, conduit means communicatably connected to said pressure chamber, and restriction means provided in said conduit means comprising a capillary tube, the latter being disposed externally of said pressure chamber, said steam generating means being capable of supplying steam to said pressure chamber at a rate at least as great as the rate at which said conduit means permits the discharge of steam therethrough, whereby steam pressure within said chamber can be substantially maintained at a selected value during the egress of steam through said conduit means.

2. Apparatus as set forth in claim 1 wherein said capillary tube is approximately .018" of internal dimension.

3. Apparatus for sterilizing articles and for preparing distilled water comprising:
    a pressure chamber;
    steam generating means for supplying steam within said pressure chamber;
    means to permit slow egress of steam from said chamber at a slow rate no greater than the rate of generation of steam within said chamber, said means permitting slow egress of steam comprising a fine restrictive tubing, said fine restrictive tubing being disposed externally of said pressure chamber;
    whereby said steam generating means is capable of supplying steam to said pressure chamber at a rate at least as great as said fine restrictive tubing permits the discharge of steam therethrough so that steam pressure within said chamber can be substantially maintained at a selected value during the egress of steam through said fine restrictive tubing.

References Cited

UNITED STATES PATENTS

| | | | |
|---|---|---|---|
| 920,224 | 5/1909 | Valentiner | 203—91 X |
| 2,565,568 | 8/1951 | McCants | 203—92 X |
| 3,259,111 | 7/1966 | Koch. | |
| 3,272,258 | 9/1966 | Bourquard | 165—11 X |
| 3,297,004 | 1/1967 | Midtlying. | |
| 1,183,142 | 5/1916 | Underwood | 203—11 |
| 1,902,625 | 3/1933 | Dunham | 21—94 X |
| 3,214,352 | 10/1965 | Wells | 203—11 X |
| 3,373,088 | 3/1968 | Harkee et al. | 203—11 X |

FOREIGN PATENTS 1,226    1895    Great Britain.

NORMAN YUDKOFF, *Primary Examiner.*

J. SOFER, *Assistant Examiner.*